United States Patent
Foskey et al.

(10) Patent No.: US 9,499,262 B2
(45) Date of Patent: Nov. 22, 2016

(54) COMPOSITE FLEXURE FOR TILTROTOR ROTOR SYSTEM

(71) Applicant: Bell Helicopter Textron Inc., Fort Worth, TX (US)

(72) Inventors: Christopher Foskey, Keller, TX (US); Frank B. Stamps, Colleyville, TX (US); Joel McIntyre, Southlake, TX (US); Gary Miller, North Richland Hills, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 318 days.

(21) Appl. No.: 13/958,192

(22) Filed: Aug. 2, 2013

(65) Prior Publication Data

US 2015/0034772 A1  Feb. 5, 2015

(51) Int. Cl.
*B64C 27/33* (2006.01)
*B64C 27/48* (2006.01)
*B64C 29/00* (2006.01)

(52) U.S. Cl.
CPC ............ *B64C 27/33* (2013.01); *B64C 27/48* (2013.01); *B64C 29/0033* (2013.01)

(58) Field of Classification Search
CPC .............................. B64C 27/33; B64C 27/48
See application file for complete search history.

(56) References Cited

U.S. PATENT DOCUMENTS

| | | | |
|---|---|---|---|
| 3,695,779 A * | 10/1972 | Kastan et al. | 416/135 |
| 4,650,401 A | 3/1987 | Yao et al. | |
| 4,690,615 A * | 9/1987 | Kuntze-Fechner et al. | 416/134 A |
| 4,892,461 A * | 1/1990 | Matsumoto et al. | 416/134 A |
| 4,898,515 A * | 2/1990 | Beno et al. | 416/134 A |
| 5,096,380 A * | 3/1992 | Byrnes et al. | 416/134 A |
| 5,263,821 A | 11/1993 | Noehren et al. | |
| 5,358,381 A | 10/1994 | Covington et al. | |
| 5,431,538 A * | 7/1995 | Schmaling et al. | 416/134 A |
| 5,690,474 A * | 11/1997 | Byrnes et al. | 416/134 A |
| 5,738,494 A * | 4/1998 | Schmaling | 416/134 A |
| 6,375,426 B1 | 4/2002 | Brack et al. | |
| 6,659,722 B2 | 12/2003 | Sehgal et al. | |
| 6,708,921 B2 | 3/2004 | Sims et al. | |
| 6,739,834 B2 * | 5/2004 | Mochida et al. | 416/134 A |
| 7,665,969 B2 * | 2/2010 | Stamps et al. | 416/134 A |
| 7,845,909 B2 * | 12/2010 | Stamps et al. | 416/134 A |
| 8,122,586 B2 | 2/2012 | Muylaert et al. | |
| 2002/0153450 A1 * | 10/2002 | Sims et al. | 244/17.11 |

(Continued)

FOREIGN PATENT DOCUMENTS

WO    2010082936 A1    7/2010

OTHER PUBLICATIONS

Examination Report in related European Application No. 13199603. 5, dated Dec. 1, 2014, 4 pages.

(Continued)

*Primary Examiner* — Joseph W Sanderson
(74) *Attorney, Agent, or Firm* — Bell Helicopter Textron Inc.

(57) ABSTRACT

A composite flexure that secures a rotor blade to a gimbaled yoke in a tiltrotor rotor system. The composite flexure includes a composite flexure member, a first end, and a second end. The first end of the composite flexure couples the composite flexure to the gimbaled yoke, and the second end of the composite flexure couples the composite flexure to the rotor blade. The composite flexure is twisted when the composite flexure is not subject to torsional loads in order to accommodate various forces imparted on the rotor system.

14 Claims, 7 Drawing Sheets

(56) References Cited

U.S. PATENT DOCUMENTS

| | | |
|---|---|---|
| 2003/0086786 A1* | 5/2003 | Mochida et al. ......... 416/134 A |
| 2006/0165527 A1* | 7/2006 | Stamps et al. ............ 416/134 A |
| 2008/0101934 A1* | 5/2008 | Stamps et al. ............ 416/134 A |
| 2010/0124501 A1 | 5/2010 | Muylaert et al. |
| 2013/0004311 A1 | 1/2013 | Stamps et al. |
| 2013/0280075 A1* | 10/2013 | Kuntze-Fechner et al. ........................ 416/204 R |
| 2013/0280076 A1* | 10/2013 | Kuntze-Fechner et al. ........................ 416/204 R |

OTHER PUBLICATIONS

Official Action in related European Application No. 13199603.5, dated Jun. 3, 2014, 6 pages.

European Search Report in related European Application No. 13199603.5, dated May 19, 2014, 3 pages.

* cited by examiner

COMPOSITE FLEXURE FOR TILTROTOR ROTOR SYSTEM

TECHNICAL FIELD

This invention relates generally to tiltrotor aircraft, and more particularly, to a composite flexure for a tiltrotor rotor system.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to accommodate various forces imparted on a tiltrotor rotor system without the use of elastomeric bearings. A technical advantage of one embodiment may include the capability to reduce the size of tiltrotor blades by eliminating at least some elastomeric bearings located within the blades.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
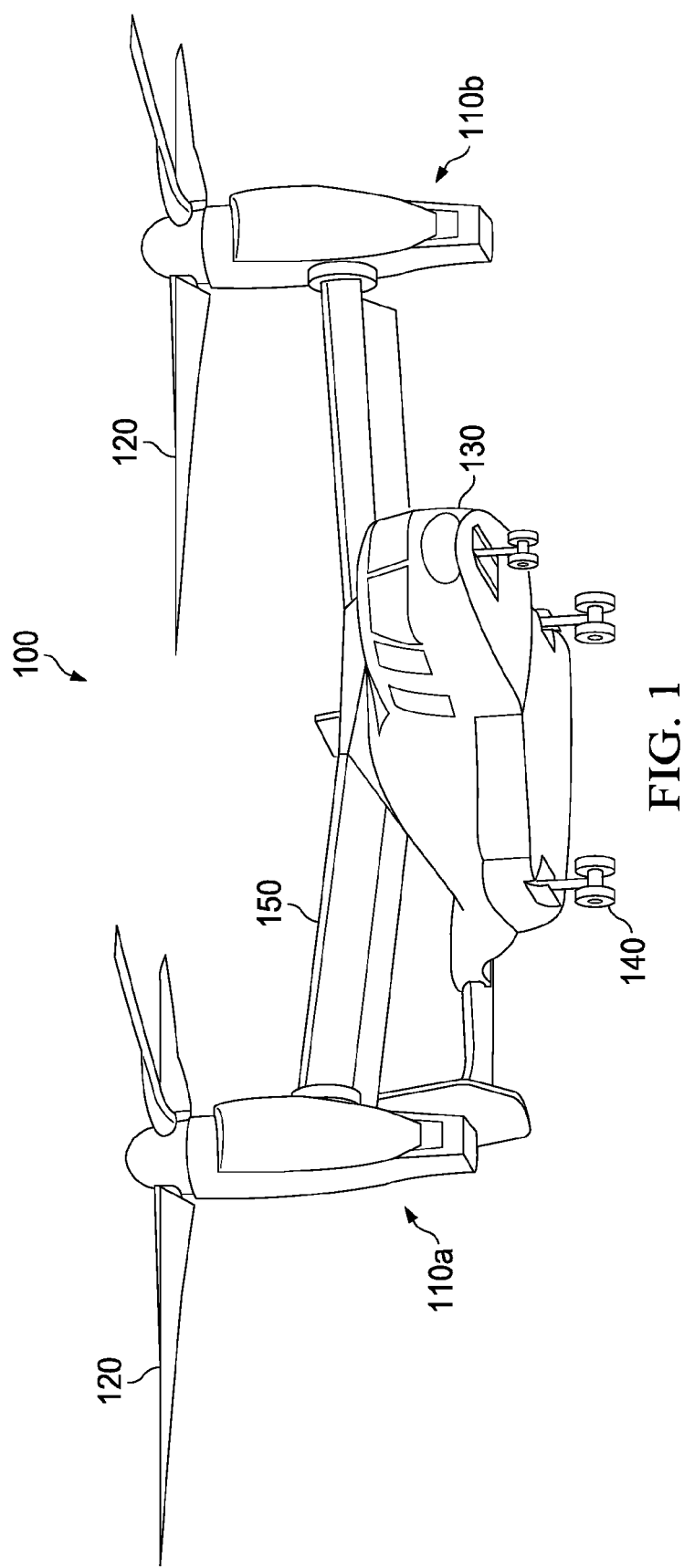
FIG. 1 shows a tiltrotor aircraft according to one example embodiment.

FIG. 1 shows a rotorcraft 100 according to one example embodiment. Rotorcraft 100 features rotor systems 110a and 110b, blades 120, a fuselage 130, a landing gear 140, and a wing 150.

Rotor system 110 may rotate blades 120. Rotor system 110 may include a control system for selectively controlling the pitch of each blade 120 in order to selectively control direction, thrust, and lift of rotorcraft 100. In the example of FIG. 1, rotorcraft 100 represents a tiltrotor aircraft, and rotor systems 110a and 110b feature rotatable nacelles. In this example, the position of nacelles 110a and 110b, as well as the pitch of rotor blades 120, can be selectively controlled in order to selectively control direction, thrust, and lift of tiltrotor aircraft 100.

Fuselage 130 represents the main body of rotorcraft 100 and may be coupled to rotor system 110 (e.g., via wing 150) such that rotor system 110 and blades 120 may move fuselage 130 through the air. Landing gear 140 supports rotorcraft 100 when rotorcraft 100 is landing and/or when rotorcraft 100 is at rest on the ground.

Teachings of certain embodiments relating to rotor systems described herein may apply to rotor system 110 and/or other rotor systems, such as non-tilting rotor and helicopter rotor systems. It should also be appreciated that teachings from rotorcraft 100 may apply to aircraft other than rotorcraft, such as airplanes and unmanned aircraft, to name a few examples.

In the example of FIG. 1, tiltrotor aircraft 100 may operate in a helicopter mode by tilting the nacelles upright and in an airplane mode by tilting the nacelles forward. Tiltrotor aircraft 100 may generate greater forward speed in airplane mode than in helicopter mode because, in airplane mode, blades 120 are oriented to generate greater thrust propelling the aircraft forward (somewhat analogous to a propeller).

Figure 2:
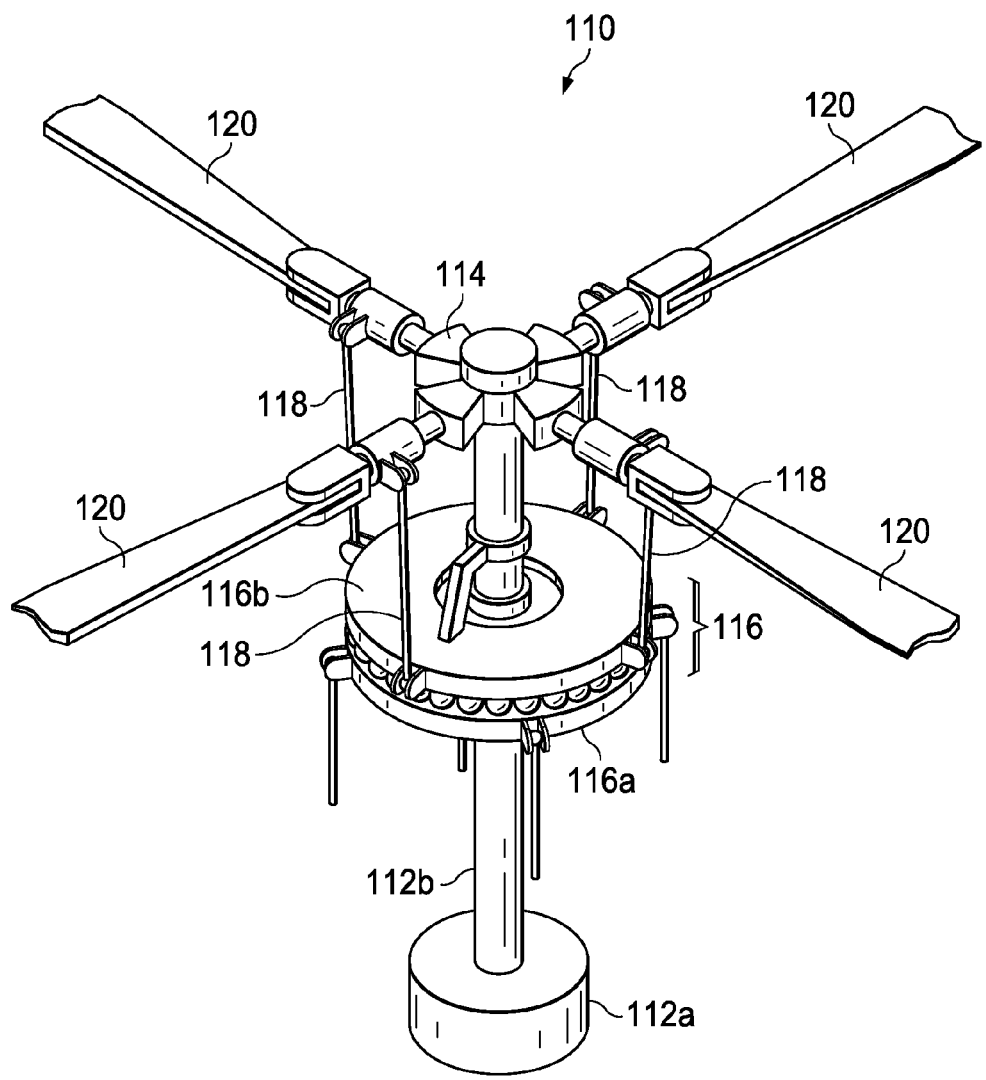
FIG. 2 shows a simplified example of a rotor system that may be incorporated in whole or in part in the rotorcraft of FIG. 1.

FIG. 2 shows a simplified example of a rotor system 110 that may be incorporated in whole or in part in the rotorcraft 100 of FIG. 1. In the example of FIG. 2, rotor system 110 features a power train 112, a yoke 114, a swashplate 116, and pitch links 118. In some examples, rotor system 110 may include more or fewer components. For example, FIG. 2 does not show components such as a gearbox, drive links, drive levers, tilting devices, and other components that may be incorporated.

Power train 112 features a power source 112a and a drive shaft 112b. Power source 112a, drive shaft 112b, and yoke 114 are mechanical components for transmitting torque and/or rotation. Power train 112 may include a variety of components, including an engine, a transmission, and differentials. In operation, drive shaft 112b receives torque or rotational energy from power source 112a and rotates yoke 114. Rotation of rotor yoke 114 causes blades 120 to rotate about drive shaft 112b. In some embodiments, power train 112 may include more or fewer components. For example, in some embodiments, tilting devices may be provided in mechanical communication with power train 112 that allows certain components of rotor system 110 to tilt between helicopter mode and airplane mode.

Swashplate 116 translates rotorcraft flight control input into motion of blades 120. Because blades 120 are typically spinning when the rotorcraft is in flight, swashplate 116 may transmit flight control input from the non-rotating fuselage to the yoke 114, blades 120, and/or components coupling yoke 114 to blades 120 (e.g., grips and pitch horns). References in this description to coupling between a pitch link and a yoke may also include, but are not limited to, coupling between a pitch link and a blade or components coupling a yoke to a blade.

In some examples, swashplate 116 may include a non-rotating swashplate ring 116a and a rotating swashplate ring 116b. Non-rotating swashplate ring 116a does not rotate with drive shaft 112b, whereas rotating swashplate ring 116b does rotate with drive shaft 112b. In the example of FIG. 2, pitch links 118 connect rotating swashplate ring 116b to blades 120.

In operation, according to one example embodiment, translating the non-rotating swashplate ring 116a along the axis of drive shaft 112b causes the pitch links 118 to move up or down. This changes the pitch angle of all blades 120 equally, increasing or decreasing the thrust of the rotor and causing the aircraft to ascend or descend. Tilting the non-rotating swashplate ring 116a causes the rotating swashplate 116b to tilt, moving the pitch links 118 up and down cyclically as they rotate with the drive shaft. This tilts the thrust vector of the rotor, causing rotorcraft 100 to translate horizontally following the direction the swashplate is tilted.

During operation, rotor system 110 may be subject to a variety of forces. As one example, the weight of blades 120 and the lift of blades 120 may result in transverse forces on yoke 114 and other components. Two examples of transverse forces may include forces resulting from flapping and coning of blades 120. Flapping may generally refer to the up-and-down movement of a rotor blade positioned at a right angle to the plane of rotation. Coning may generally refer to the upward flexing of a rotor blade due to lift forces acting on the rotor blade.

As another example, rotor system 110 may be subject to other forces, such as axial, lead/lag, and feathering forces. Axial forces may general refer to forces on rotor system 110 resulting from the centrifugal force on the rotor blades during rotation of the rotor blades. Lead and lag forces may generally refer to forces resulting from the horizontal movement of rotor blades about a vertical pin. Lead and lag forces may occur, for example, if blades 120 do not rotate faster or slower than the rotation of yoke 114. Feathering forces may generally refer to forces resulting from twisting motions that cause a rotor blade to change pitch.

Such forces may cause damage to rotor system 110 during operation if, for example, the magnitude of the forces is too high or the motions causing such forces occur too frequently. In some configurations, an elastomeric material may be provided to reduce rotor fatigue. An elastomeric material is a material, such as a polymer, having the property of viscoelasticity (colloquially, "elasticity"). An example of an elastomeric material is rubber. Elastomeric materials generally have a low Young's modulus and a high yield strain when compared to other materials. Elastomeric materials are typically thermosets having long polymer chains that cross-link during curing (i.e., vulcanizing).

Use of elastomeric bearing assemblies in a rotor system such as rotor system 110, however, may create some design issues. For example, applying forces against an elastomeric bearing may generate a considerable amount of heat. In addition, elastomeric materials may be prone to failure during tension and torsion. Accordingly, elastomeric bearings may be sized large enough to dissipate heat appropriately and to withstand the tension and torsion forces that may occur during operation of rotor system 110. Large elastomeric bearing packages, however, may increase the size of various components of rotor system 110 and blades 120. For example, yoke 114 should be large enough to accommodate the elastomeric bearing package. As another example, in some rotor systems (such as in some tiltrotor aircraft), the elastomeric bearing package may be located inside an interior portion of a blade 120. In this example, a larger elastomeric bearing package may require a thicker blade 120, which may reduce the aerodynamic effectiveness of the blade 120.

Accordingly, teachings of certain embodiments recognize the capability to accommodate various forces imparted on rotor system 110 without the use of elastomeric bearings. For example, as will be explained in greater detail below, teachings of certain embodiments recognize the capability of a composite flexure to accommodate various forces imparted on rotor system 110.

Figure 3:
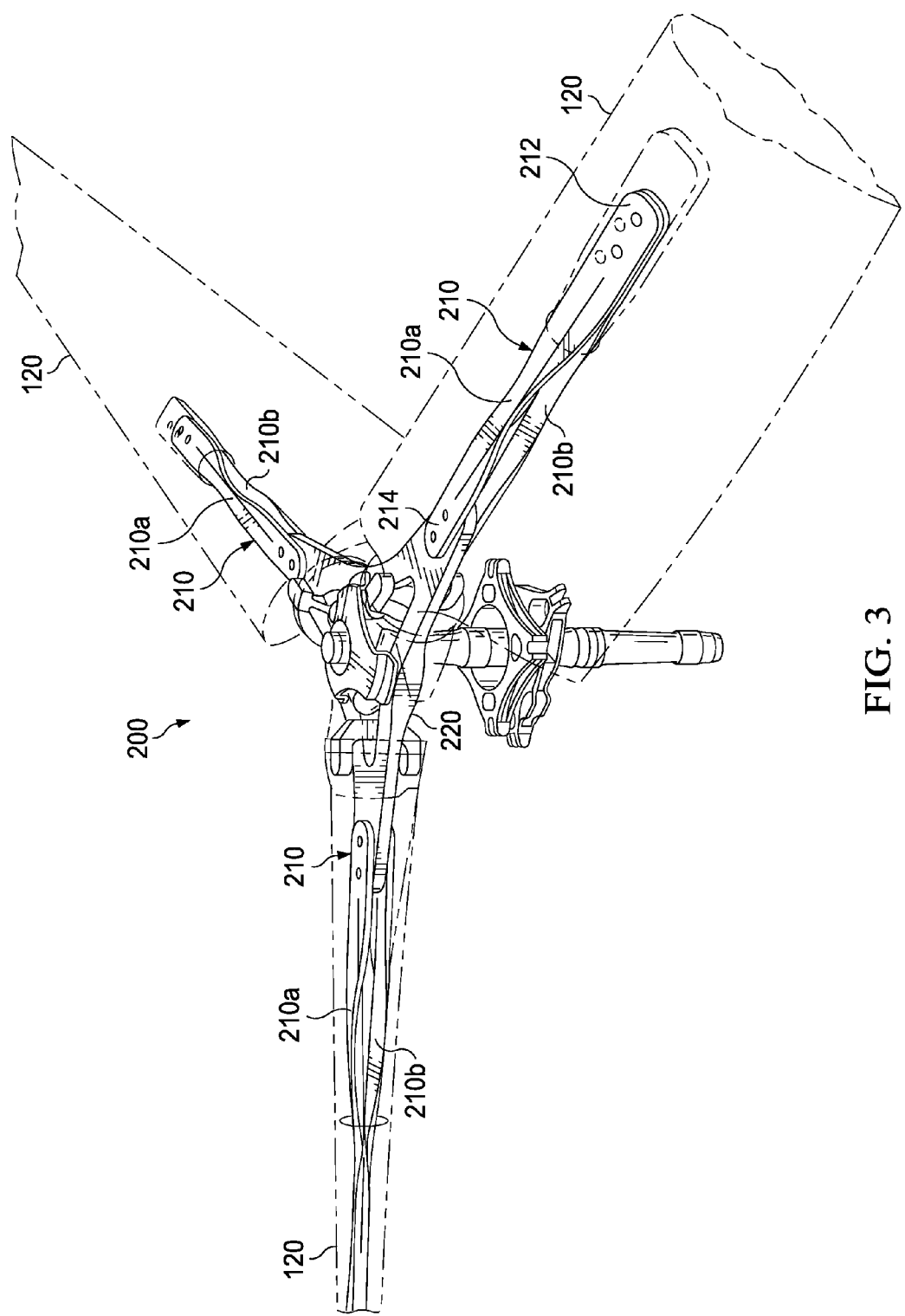
FIGS. 3-6 show a tiltrotor rotor system featuring composite flexures according to one example embodiment.
Figure 4:
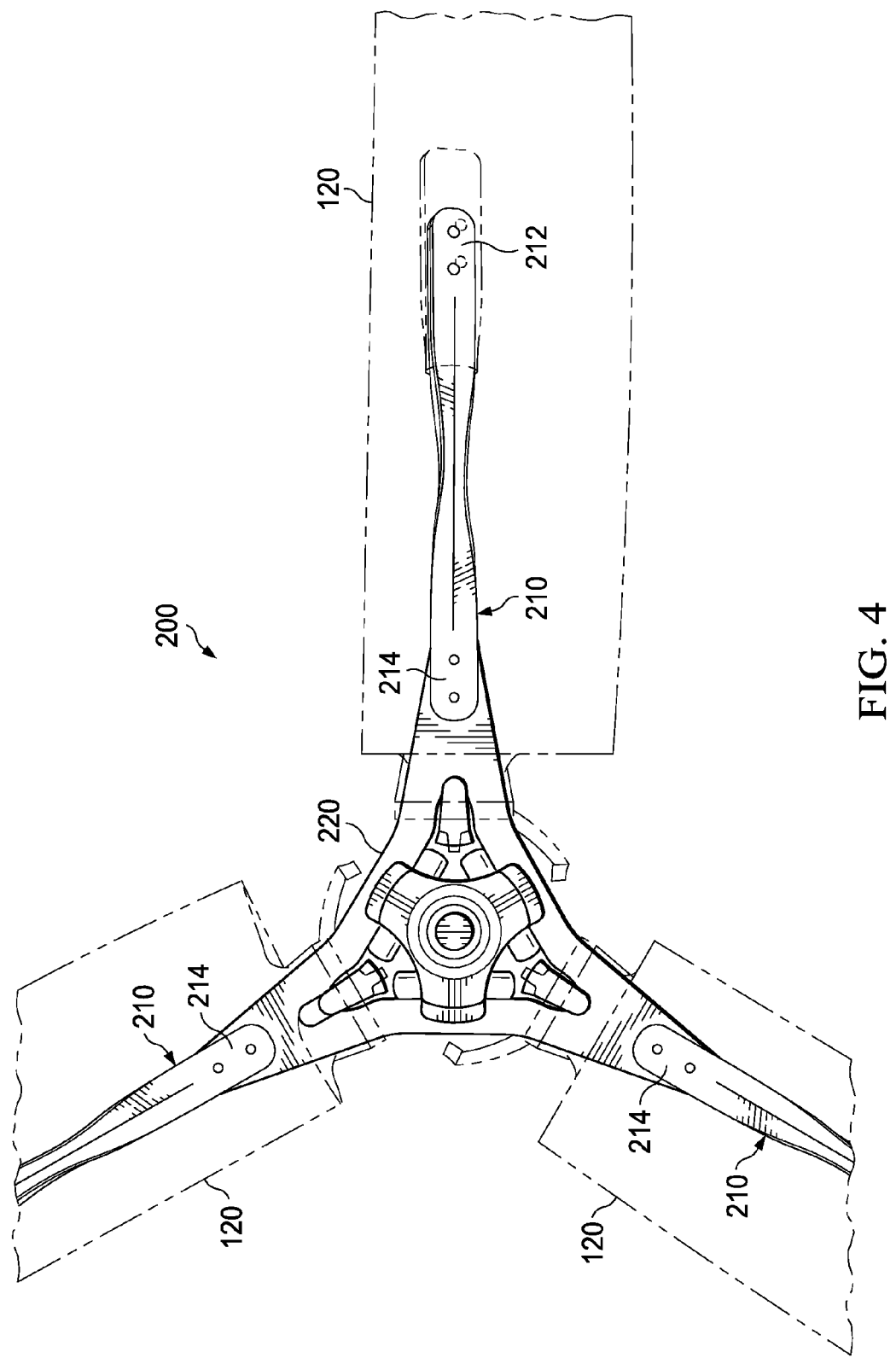
Figure 5:
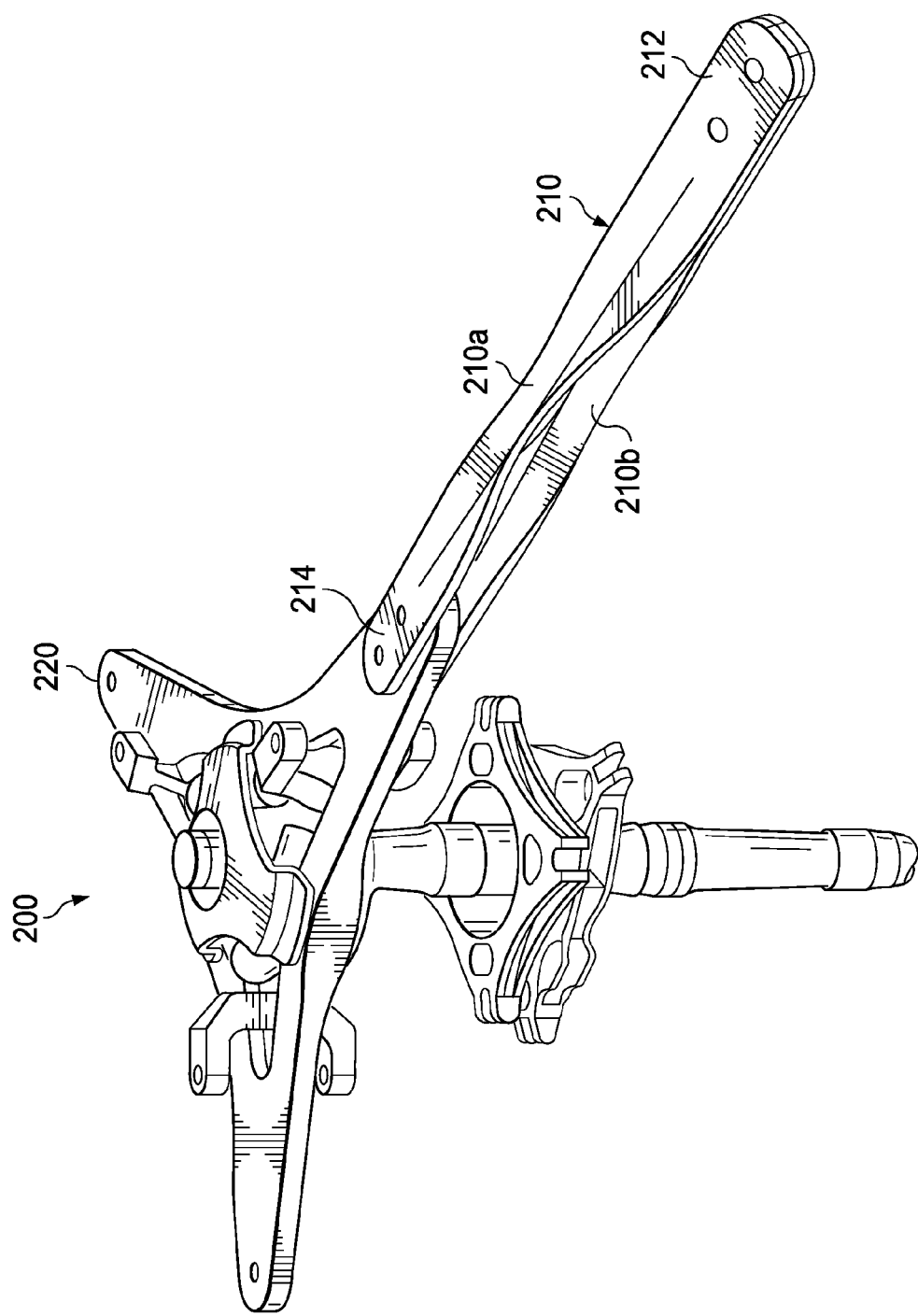
Figure 6:
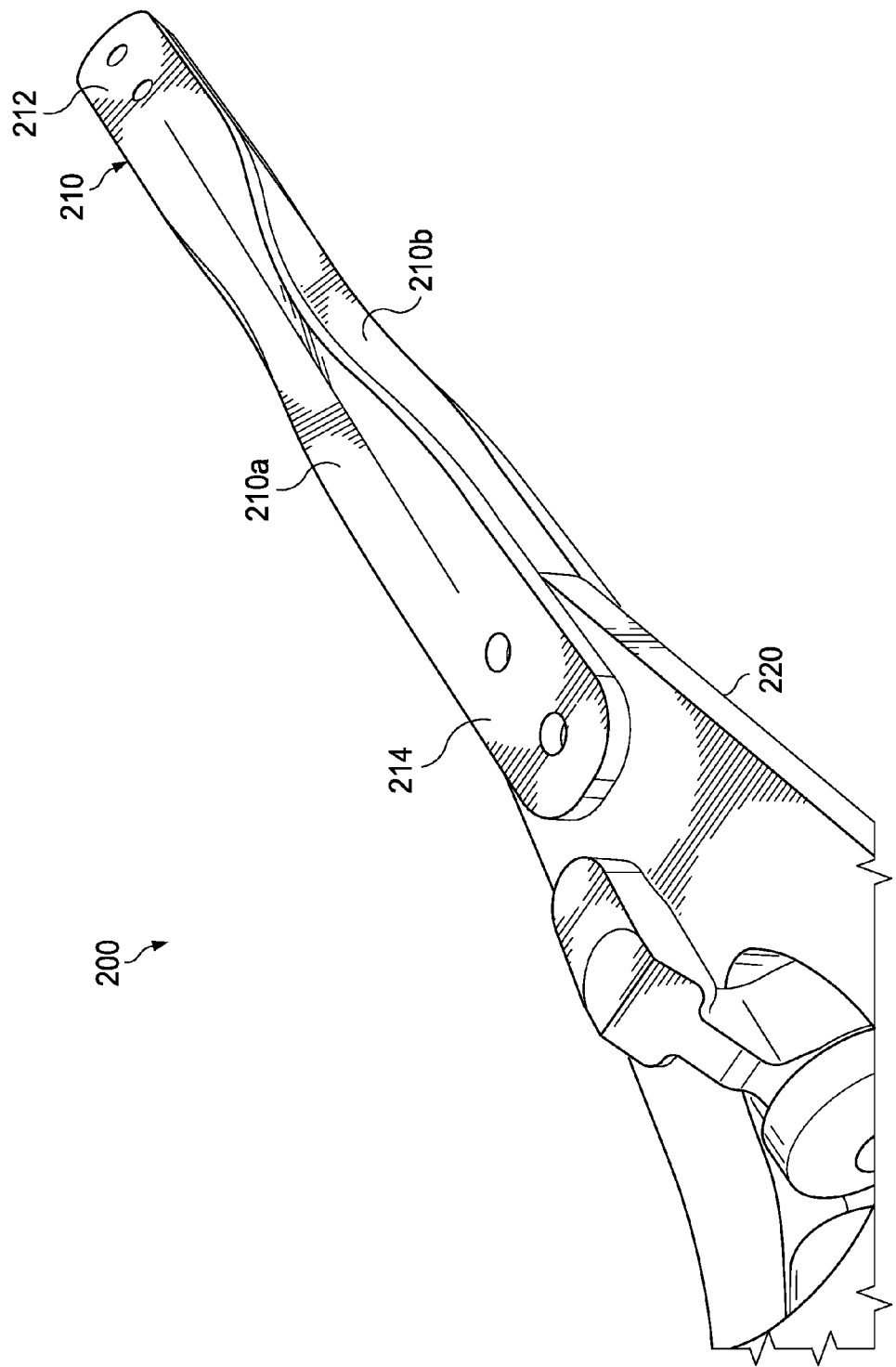

FIGS. 3-6 show a rotor system 200 according to one example embodiment. FIG. 3 shows a perspective view of rotor system 200 with blades 120 installed (blades 120 are shown as partially transparent for clarity). FIG. 4 shows a top view of rotor system 200 with blades 120 installed (blades 120 are shown as partially transparent for clarity). FIGS. 5 and 6 show perspective views of rotor system 200 with blades 120 removed.

In the example of FIGS. 3-6, rotor system 200 features a composite flexure 210 and a yoke 220. Composite flexure features composite flexure members 210a and 210b. In the example of FIGS. 3-4, each blade 120 is coupled to composite flexure member 210 at an attachment plane 212 at one end of composite flexure member 210, and yoke 220 is coupled to composite flexure member 210 at an attachment plane 214 at the opposite end of composite flexure member 210.

Composite flexure 210 and/or yoke 220 may be a composite part made of any suitable constituent materials. For example, in some embodiments, composite flexure 210 and/or yoke 220 are constructed from reinforcement material, such as fiberglass, suspended in a matrix material, such as an epoxy resin. In some embodiments, composite flexure 210 and yoke 220 are constructed as separate parts and then coupled together (e.g., via bolts or other coupling devices). For example, FIGS. 3-6 show composite flexure 210 as including two independent composite flexure 210a and 210b that are coupled to blade 120 at attachment plane 212 and to yoke 220 at attachment plane 214.

In some example embodiments, composite flexure 210 is integral with other rotor system components. For example, composite flexure 210 and yoke 220 can be constructed together as a single, integral composite structure. In these examples, there may not be a clear boundary indicating where composite flexure 210 ends and yoke 220 begins. In some example embodiments, composite flexure 210 and the center coning part of yoke 220 are constructed together as a single, integral composite structure, and an attachment point can be located between the center coning portion of yoke 220 and a center portion of the hub containing the CV joint. In these examples, there may not be a clear boundary indicating where composite flexure 210 ends and yoke 220 begins. In some example embodiments, composite flexure 210 and blade 120 are constructed together as a single, integral composite structure, and an attachment point can be located between the twisting portion of composite flexure 210 and the center coning portion of yoke 220. In these examples, there may not be a clear boundary indicating where composite flexure 210 ends and blade 120 begins. Some embodiments include combinations of the preceding examples as well as other variations with different integral combinations and different attachment points Reinforcement material within composite flexure 210 can be oriented to customize how composite flexure 210 responds to certain loads. For example, fiber reinforcement material can be provided at various angles to customize the stiffness of composite flexure 210 in different directions. For example, reinforcement material can be arranged within composite flexure 210 such that composite flexure 210 is torsionally soft and axially stiff. In this example, composite flexure 210 may allow for torsion forces to be applied to composite flexure 210 during feathering of blade 120, but composite flexure 210 may be stiff in the axial direction to provide strength in connecting blade 120 to yoke 220.

In one example embodiment, composite flexure 210 includes a number of on-axis load carrying reinforcement layers that are generally aligned with a longitudinal axis of composite flexure 210. These layers provide axial stiffness to composite flexure 210, allowing composite flexure 210 to withstand axial forces and couple a blade 120 to yoke 220. In this example embodiment, composite flexure 210 can also include a number of off-axis reinforcement layers that provide torsional flexibility to composite flexure 210 such that at least part of composite flexure 210 may twist in response to feathering of blade 120. The torsional flexibility of composite flexure 210 can be defined at least in part by the angle between the off-axis reinforcement layers and the on-axis reinforcement layers.

In some embodiments, the reinforcement layers of composite flexure 210 is configured to respond to flapping and/or coning of blades 120. For example, gimballing action of yoke 220 can accommodate the majority of forces attributable to flapping. In this example, the reinforcement layers of composite flexure 210 are configured to provide stiffness in response to flapping, thus transferring flapping forces to yoke 220. In another example, yoke 220 may not be able to accommodate forces attributable to flapping. In this second example, the reinforcement layers are configured to provide bending flexibility to the composite flexure 210 such that at least part of composite flexure 210 can bend in response to flapping of the 120 rotor blade.

Reinforcement layers of composite flexure 210 can be configured to provide a unique flexibility profile for a particular rotor system. For example, the designed flapping stiffness may drive the in-plane natural frequency of a rotor system, and the in-plane natural frequency may affect aircraft stability. If the in-plane natural frequency is too high (e.g., near or greater than 2/rev for some rotorcraft), the aircraft may become unstable. In addition, the in-plane natural frequency can increase in some configurations as the number of rotor blades increase (e.g., a 4 blade hub may have a higher in-plane natural frequency than a 3 blade hub). Accordingly, composite flexure 210 may improve aircraft stability in some configurations by providing additional flapping flexibility to a rotor system.

In some configurations, however, an aircraft may become unstable if the in-plane natural frequency of a rotor system is too low. For example, a tiltrotor aircraft may become unstable in airplane mode if rotor system allows too much chordwise flexibility and the in-plane natural frequency of the rotor system becomes less than 1/rev. Therefore, it may be desirable to achieve an in-plane natural frequency of greater than 1/rev but less than 2/rev. Teachings of certain embodiments recognize the capability to achieve a desirable in-plane natural frequency by providing a composite flexure 210 with certain bending flexibility with a hub that provides a certain amount of stiffness. As one example, a desirable in-plane natural frequency is achieved by pairing a somewhat stiffer hub (e.g., with 4 or more rotor blades) with a composite flexure 210 that provides bending flexibility. In this example, the composite flexure 210 may "tune down" the stiffer hub by making the rotor system as a whole softer in-plane as compared with traditional bearings.

In some embodiments, the reinforcement layers of composite flexure 210 are configured to respond to leading or lagging of blades 120. For example, the reinforcement layers can be configured to provide bending flexibility to the composite flexure 210 such that at least part of composite flexure 210 bends in response to leading or lagging of the rotor blade.

In the example of FIGS. 3-6, composite flexure members 210*a* and 210*b* each include a twisted body portion. For example, as seen in FIG. 6, composite flexure 210 is configured such that attachment plane 212 is at an angle relative to attachment plane 214 such that composite flexure 210 features a twisted body portion between the first end and the second end when the composite flexure is not subject to torsional loads from blade 120. This twisted body portion can correspond to an angle of twist of blade 120.

Composite flexure 210 can include a twisted body portion, in part, because composite flexure 210 attaches to an interior portion of a twisted blade 120, as seen in FIGS. 3 and 4. For example, a certain orientation of blade 120 relative to yoke 220 may be desired (e.g., an angle of the chord of the root of blade 120 relative to yoke 220). If blade 120 was attached to yoke 220 at the root of blade 120, then this angle could be easily maintained. In the example of FIGS. 3 and 4, however, composite flexure 210 is coupled to blade 120 in an interior portion of blade 120 where the chord is at an angle relative to the chord of the root of blade 120. In this example, the twist of composite flexure 120 may compensate for the angular difference between the chord of the root of blade 120 and the chord of blade 120 where blade 120 is coupled to composite flexure 210.

Figure 7:
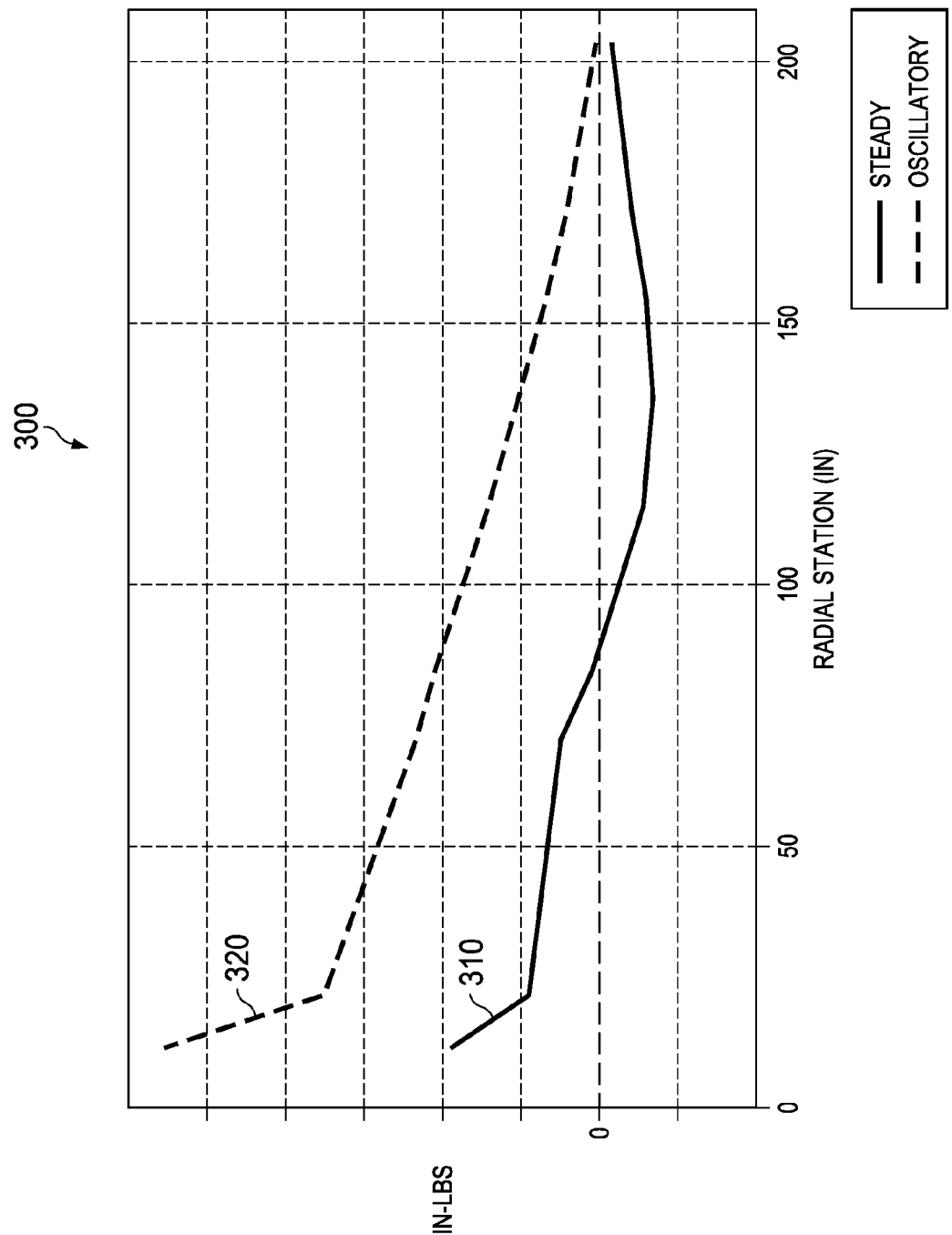
FIG. 7 shows a chart showing example designed steady chordwise fatigue loads and designed oscillatory chordwise loads for an example tiltrotor rotor blade.

Composite flexure 210 can be coupled to blade 120 at any location on blade 120. However, that stress in blade 120 may be reduced by coupling composite flexure 210 to blade 120 at a location in blade 120 where blade 120 is designed to have the lowest chordwise loads. For example, FIG. 7 shows a chart 300 showing example designed steady chordwise steady loads 310 and designed oscillatory chordwise fatigue loads 320 for an example blade 120. In the example of FIG. 7, stress in flexure 210 can be reduced if composite flexure 210 is coupled to blade 120 at a position proximate to where steady chordwise steady loads are expected to be near zero (i.e., where chordwise steady loads transition from positive to negative in chart 300).

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A tiltrotor aircraft, comprising:
   a body;
   a wing member;
   a power train coupled to the body and comprising a power source and a drive shaft in mechanical communication with the power source; and
   a rotor system coupled to the wing member and in mechanical communication with the drive shaft, at least part of the rotor system being tiltable between a helicopter mode position and an airplane mode position, the rotor system comprising:
      a gimbaled yoke in mechanical communication with the drive shaft;

a rotor blade having a single, uninterrupted blade body extending from a root end to a tip end and having a hollow cavity therein, the hollow cavity having an open end and a closed end opposite the open end, the rotor blade comprising the root end and an attachment location disposed within the hollow cavity and located outboard of the root end, the rotor blade being twisted such that an angular difference exists between the chord of the rotor blade at the root end and the chord of the rotor blade at the attachment location; and a composite flexure comprising a composite member disposed completely within the hollow cavity of the rotor blade, the composite flexure coupled to the gimbaled yoke at a first end and coupled to the rotor blade at a second end, wherein a first attachment plane associated with the first end is angled relative to a second attachment plane associated with the second end such that the composite member is twisted at a composite-flexure twist angle between the first end and the second end when the composite flexure is not subject to torsional loads, the composite-flexure twist angle between the first end and the second end corresponding to the angular difference between the chord of the rotor blade at the root end and the chord of the rotor blade at the attachment location.

2. The tiltrotor aircraft of claim 1, the composite flexure comprising a matrix material and a reinforcement material.

3. The tiltrotor aircraft of claim 2, wherein the reinforcement material comprises at least one layer of reinforcement material providing axial stiffness to the composite flexure.

4. The tiltrotor aircraft of claim 2, wherein the reinforcement material comprises a plurality of reinforcement layers configured to provide torsional flexibility to the composite flexure such that at least part of the composite flexure may twist in response to feathering of the rotor blade.

5. The tiltrotor aircraft of claim 2, wherein the reinforcement material comprises a plurality of reinforcement layers configured to provide bending flexibility to the composite flexure such that at least part of the composite flexure may bend in response to coning or flapping of the rotor blade.

6. The tiltrotor aircraft of claim 2, wherein the reinforcement material comprises a plurality of reinforcement layers configured to provide bending flexibility to the composite flexure such that at least part of the composite flexure may bend in response to leading or lagging of the rotor blade.

7. The tiltrotor aircraft of claim 1, wherein the composite flexure comprises first and second composite flexure members, each composite flexure member coupled to the gimbaled yoke at respective first ends and coupled to the rotor blade at respective second ends.

8. The tiltrotor aircraft of claim 7, wherein both the first and second composite flexure members feature respective twisted body portions.

9. The tiltrotor aircraft of claim 1, wherein the gimbaled yoke and the composite flexure are of the same integral composite structure.

10. The tiltrotor aircraft of claim 1, wherein the rotor blade and the composite flexure are of the same integral composite structure.

11. The tiltrotor aircraft of claim 1, wherein the composite flexure is coupled to the rotor blade at a position in an interior portion of the rotor blade.

12. The tiltrotor aircraft of claim 11, wherein the position is a location in the rotor blade designed to have the lowest chordwise loads.

13. The tiltrotor aircraft of claim 1, wherein the rotor system further comprises:
a second rotor blade;
a second composite flexure coupled to the gimbaled yoke at a first end and coupled to the second rotor blade at a second end;
a third rotor blade;
a third composite flexure coupled to the gimbaled yoke at a first end and coupled to the third rotor blade at a second end;
a fourth rotor blade; and
a fourth composite flexure coupled to the gimbaled yoke at a first end and coupled to the fourth rotor blade at a second end.

14. The tiltrotor aircraft of claim 1, wherein the composite flexure is removably coupled to the gimbaled yoke.

* * * * *